United States Patent [19]

Hartwig

[11] 4,244,522
[45] Jan. 13, 1981

[54] LIQUID STORAGE AND DISTRIBUTION APPARATUS FOR AGRICULTURAL IMPLEMENTS

[75] Inventor: Donald R. Hartwig, Rock Island, Ill.

[73] Assignee: Deere & Company, Moline, Ill.

[21] Appl. No.: 71,448

[22] Filed: Aug. 31, 1979

[51] Int. Cl.³ .............................................. B05B 9/00
[52] U.S. Cl. ................................. 239/148; 137/202; 239/172; 239/304
[58] Field of Search ............... 239/172, 159, 304, 148, 239/170; 137/202, 205

[56] References Cited

U.S. PATENT DOCUMENTS

| | | | |
|---|---|---|---|
| 3,976,087 | 8/1976 | Bolton et al. | 239/148 X |
| 4,108,380 | 8/1978 | Richardson | 239/172 |

OTHER PUBLICATIONS

Operators Manual–John Deere 7000, Drawn 4- and 6-Row Max-Emerge Planters.

*Primary Examiner*—Robert B. Reeves
*Assistant Examiner*—Gene A. Church

[57] ABSTRACT

Apparatus for storing and distributing a liquid from a mobile agricultural implement is provided. The apparatus includes an improved vent structure carried in the upper portion of fluid storage tanks supported on the implement, with the vent structure being self-sealing as the tanks become full or fluid sloshes within the tank during operations. A plurality of tanks are supported across the width of the implement and interconnected with one another by common hoses to simplify filling operations from a common supply source. A manual valve is provided between the lines and tanks on each side of the implement to prevent fluid transfer between tanks as the implement is moved over uneven ground and a split manifold pump receives fluid equally from each side of the implement to assume equal fluid weight distribution across the implement as the fluid is distributed. A quick connect valve is provided with an inlet line connected to the storage tanks to permit filling of all tanks simultaneously from a mobile supply tank.

4 Claims, 6 Drawing Figures

LIQUID STORAGE AND DISTRIBUTION APPARATUS FOR AGRICULTURAL IMPLEMENTS

BACKGROUND OF THE INVENTION

The present application relates to agricultural implements and more specifically relates to liquid storage and distribution apparatus for use with agricultural implements.

It has been common to carry liquid materials, such as fertilizer, in tanks spaced across the frame of an agricultural implement such as a planter. For example, the John Deere 7000 Drawn 8-Row Max-Emerge planters are provided with a liquid fertilizer apparatus which includes several liquid storage tanks spaced across the frame of the implement and interconnected by fluid lines with one another and with the various ground distribution applicators to permit the liquid material to flow from the tanks to the various applicators from any or all of the tanks.

The storage tanks are filled from a common source, such as a supply tank carried on a separate frame or one stored at a central location. When an operator wanted to fill the storage tanks from a supply tank, he would connect the pump of the supply tank with the storage tanks and pump fluid through a supply line to each of the storage tanks. Each of the storage tanks had an opening in the lid to permit escape of the air from the tank during filling, but these openings were closed with lids provided with air vents that permitted escape of the fluid from the tank once it filled. Accordingly, the operator had to give constant attention to the filling operation to avoid spillage of the liquid from the storage tanks as they became filled.

Further, when the implement was moved over uneven or hilly terrain, liquid would spill through the vents in the lids as it shifted in the tank. Some tanks were also interconnected by fluid inlet lines and too, when the fluid was applied on hilly terrain, it would shift from the uphill tank to the lower tank further complicating the overflowage problem from the vents.

SUMMARY OF THE INVENTION

These problems are overcome in the improved liquid material storage and distribution apparatus subject of the application herein. The present invention provides a unique tank vent lid structure that prevents spillage of the liquid when the respective tanks are filled from a common source, such as a nurse tank. This vented lid further permits entry of the air into the tank to allow for proper fluid flow from the tank during distribution operations. Further, to prevent fluid flow between the tanks when operated on uneven terrain, valving is provided in fluid lines interconnecting the tanks and used to fill the tanks from their respective bottoms.

A single pump serves to pump fluid from all the tanks for distribution and is provided with a split manifold intake so as to draw equally from the tanks on each side of the implement frame during operations and maintain proper fluid distribution across the implement.

This pump is also provided with a split distribution manifold to dispense the fluid equally to each side of the implement and thus insure better and more even distribution from the ground distributing apparatus.

A single quick coupler connection is provided on the inlet fluid lines for coupling with a mobile nurse tank so as to permit the implement storage tanks to be filled in the field and eliminate the need to return the implement to a central location for filling.

DESCRIPTION OF THE PREFERRED EMBODIMENT

Figure 1:
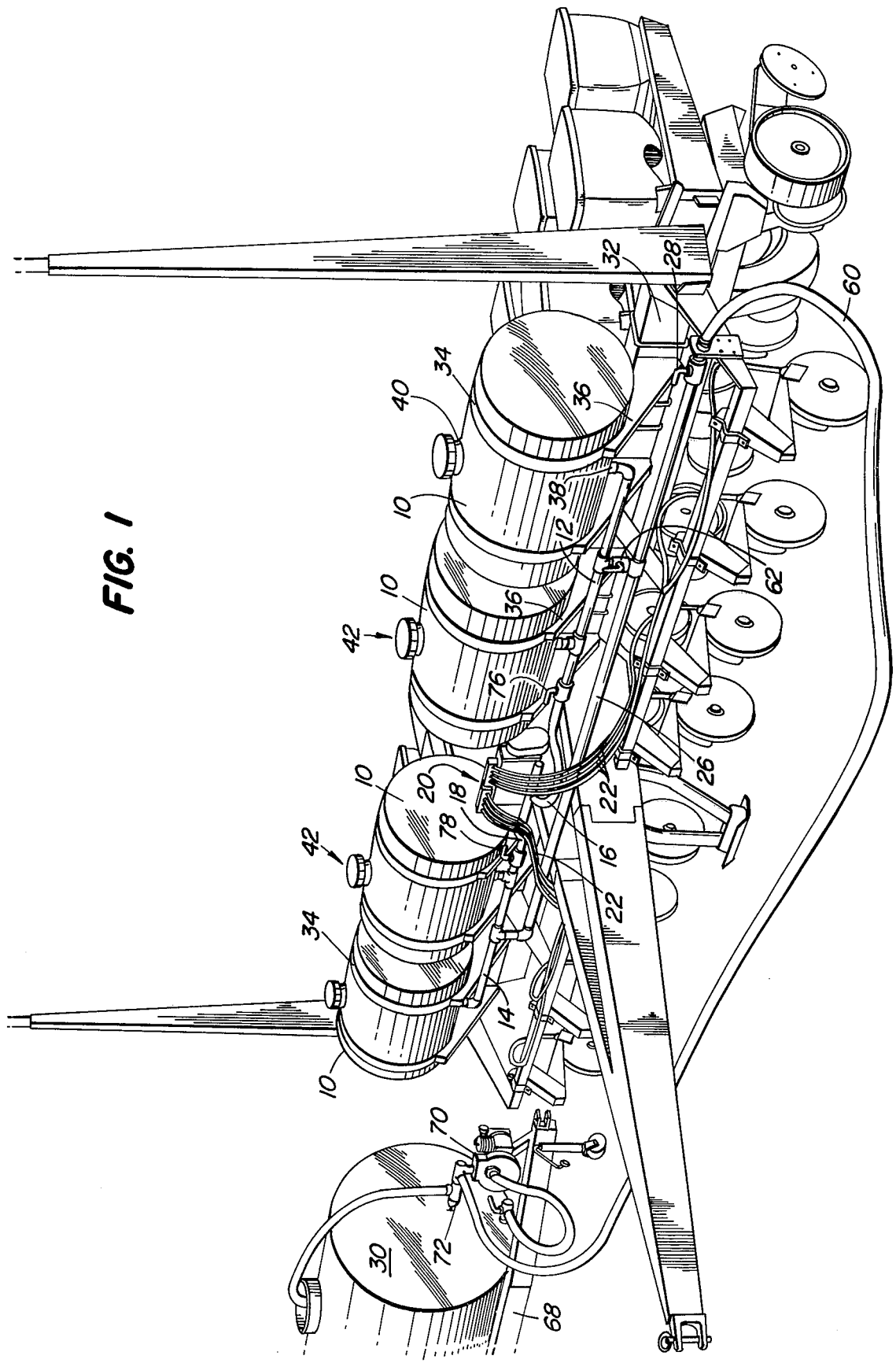
FIG. 1 is a perspective view of a fluid storage distribution system.

The storage and distribution apparatus of the present invention is illustrated in combination with a planter in FIG. 1. The apparatus includes tanks 10 for storing and carrying a fluid, such as a liquid fertilizer, commom fluid inlet lines 12 and 14 coupled to the tanks 10, outlet lines 16 and 18 coupled with the tanks 10 and a distributor pump 20 and fluid delivery lines 22 coupled with the pump and respective applicator or sprayer devices 24. Coupling the inlet lines is a filling line numbered 26. At one end of the filling line 26 is a coupling valve 28 for connecting that line to a nurse tank 30 similar to that illustrated in FIG. 1.

Figure 4:
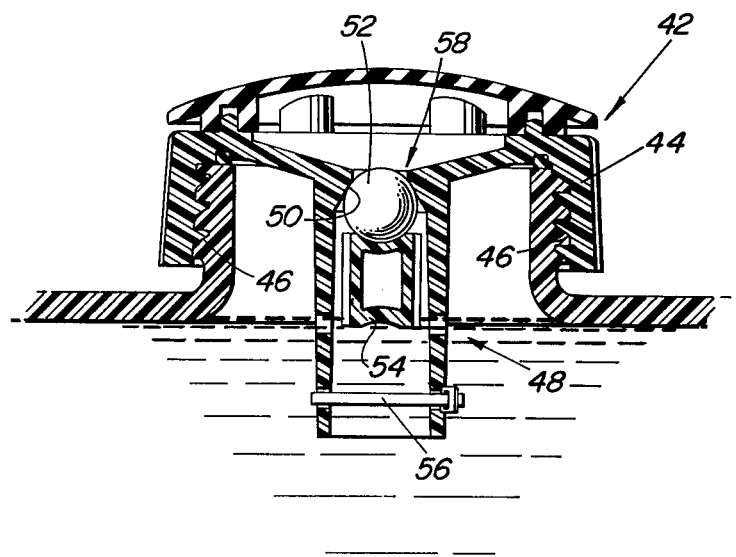
FIG. 4 is a view of the vent cap with its floating check valve taken along lines 4—4 of FIG. 3.
Figure 3:
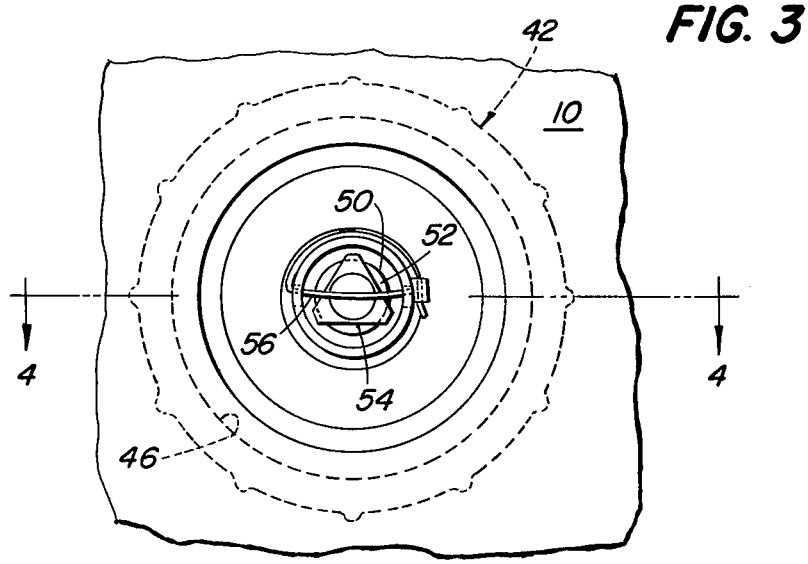
FIG. 3 is a bottom view of the vent cap.

In the preferred embodiment, the planter carries four tanks 10 spaced across it and supported upon the main transverse frame member 32. Steel bands or similar support means 34 encircle each tank 10 to secure them on respective saddle mounts 36 fixed to the transverse frame member 32. Each tank 10 has inlet openings 38 in its bottom portion and an opening 40 in its upper portion. The opening 40 in the upper portion of each tank 10 is best shown in FIG. 4 and has an upwardly projecting portion with external threads to which respective vent caps are attached.

The vent cap 42 is comprised of a outer sleeve 44 having internal threads for mating with the threaded portion 46 of the tank 10 and a central upright valve arrangement 48. The valve arrangement 48 includes a seating surface 50 in the shape of an inverted V, a rubber ball 52 compatibly sized to seal against the seat 50 and a floatable ball support structure 54. Mounted perpendicular to and below the support structure 54 is a stop pin for maintaining the support structure 54 within the cap 42. As is apparant from FIG. 5, the float support 48 will be lifted as fluid fills the tank 10. The support will in turn elevate the ball 52 to force it against the seat 50 and prevent fluid loss. Correspondingly, as fluid is drained from the tank 10, the floatable support 54 will drop to the pin 56, the ball 52 will become unseated and air will be able to pass through the vent opening 58 to permit the fluid to flow through the outlet lines 16 and 18 and to the pump 20.

Looking again to FIGS. 1 and 2, it will be seen that each of the tanks 10 are provided with inlet openings 38 that are interconnected by respective inlet fluid lines 12 and 14. In the preferred embodiment, a single inlet line 12 or 14 is provided to each half of the implement or for each pair of tanks 10. A second filling inlet line 26 is coupled with the paired inlet lines 12 and 14 to each set of tanks 10 and permits the use of a single valve 28 for coupling the storage tanks 10 with the nurse tank line 60 when filling the tanks 10. Between the inlet lines 12 and 14 to each pair of tanks 10 is a shutoff valve 62 that can be closed to prevent fluid flow between the pairs of tanks 10 on hilly or uneven terrain. This valve 62 must be opened when the tanks 10 are filled from the nurse tank. Each of the inlet lines 12 and 14 are coupled through lines 16 and 18 respectively with the distributor pump 20 for delivering the fluid material from the tanks 10 and to the respective openers or sprayer mechanisms 24.

Figure 6:
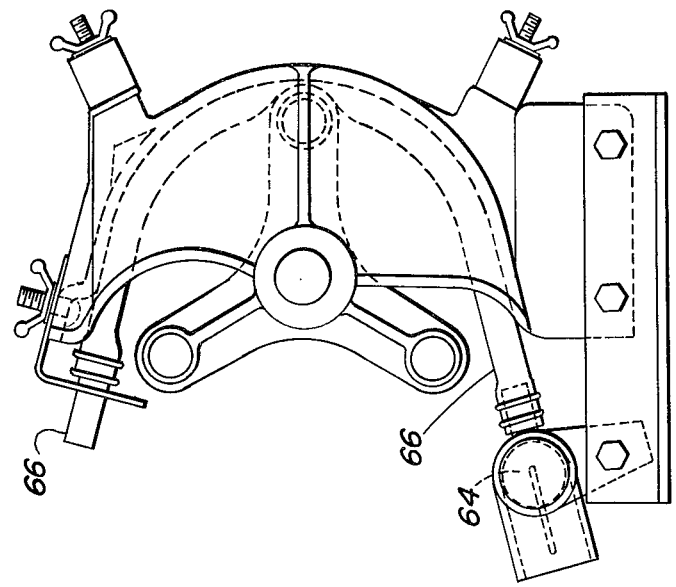
FIG. 6 is a side view of the split manifold pump.
Figure 5:
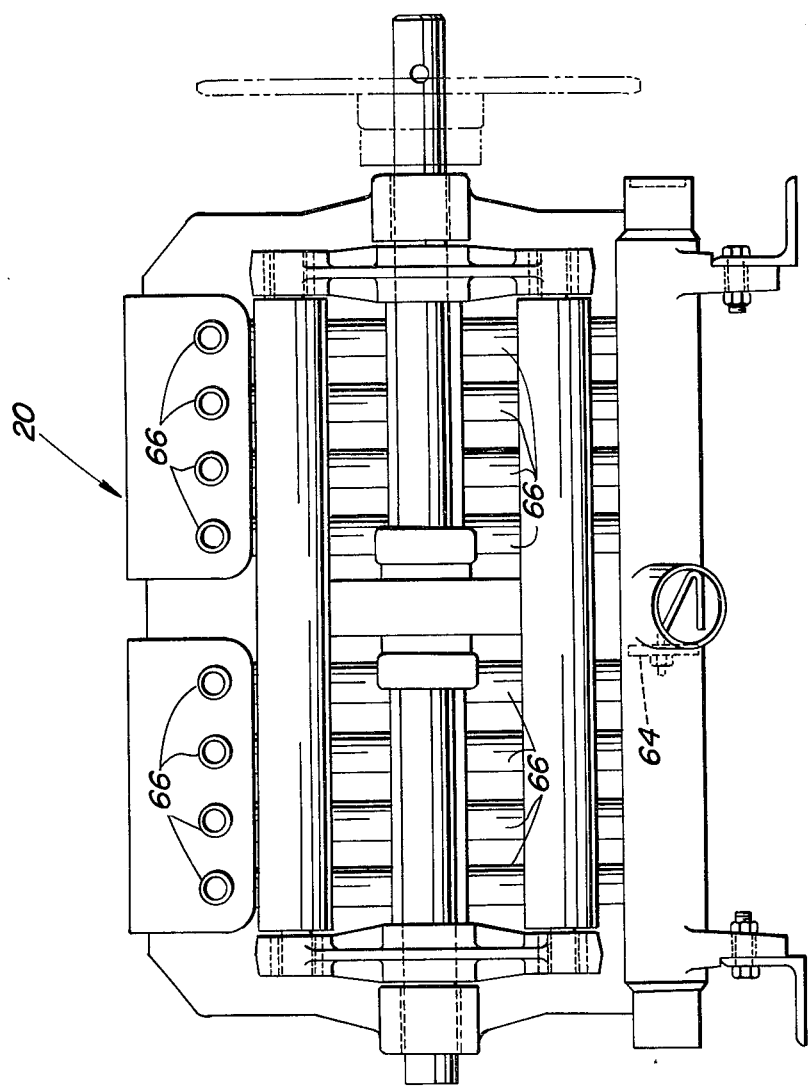
FIG. 5 is a front view of the split manifold pump.

The pump 20, illustated in FIGS. 1, 5 and 6, receives fluid from the tanks 10 carried on each half of the planter. The pump 20 receives fluid from the outlet lines numbered 16 and 18. As shown in FIGS. 5 and 6, the pump 20 is of the roller type and has a divided inlet to enable it to function similarly to two separate pumps operating in synchronization. At the outlet side of the inlet manifold are separate hoses 66 which are squeezed by the pump roller to force fluid throught the respective delivery lines 22 coupled with the respective application devices 24. Since the stop 64 in the manifold keeps the fluid received from each half of the implement separate, it is directed through the outlet lines 66 and moved to the sprayer apparatus 24 on the same respective side of the implement. Accordingly, fluid is prevented from being drained from the tanks on one side of the implement faster than from the other.

Looking now at the nurse tank arrangement illustrated in FIG. 1, it will be seen that the large tank 30 is mounted on a separate mobile frame 68 for movement to and from the fields. The frame 68 is provided with a separate pump 70 to move the fluid from the nurse tank 30 and to the storage tanks 10.

Figure 2:
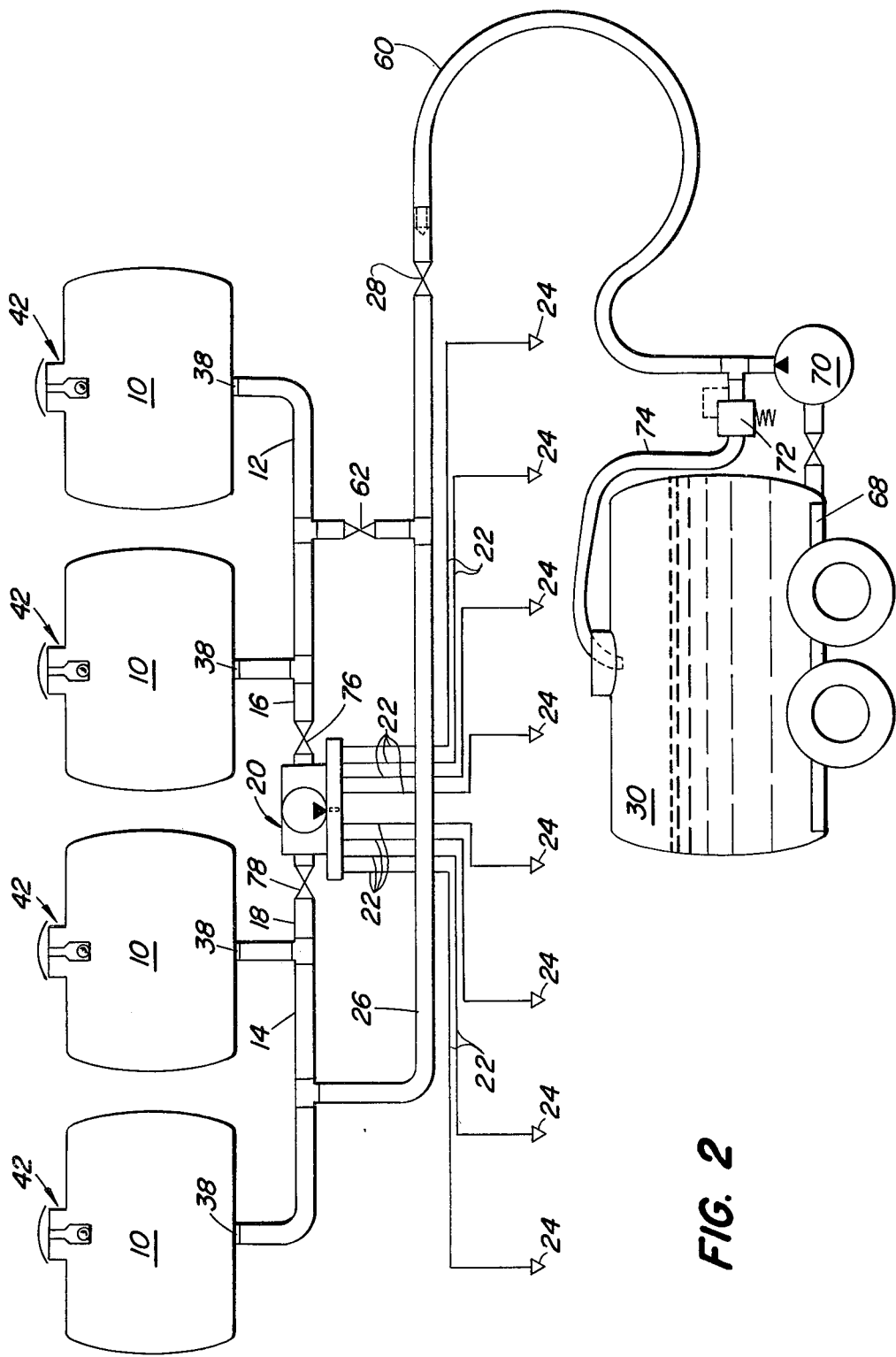
FIG. 2 is a schematic illustration of fluid storage and distribution system of FIG. 1.

As illustrated in the schematic of FIG. 2, the fluid from the nurse tank 30 is pumped from the tank 30 and through the hose 60, through coupling 28 and then through line 26 to the inlet lines 12 and 14 and into each storage tank 10. The nurse tank pump 70 is provided with a fixed pressure relief valve 72 in the line 74 between it and the nurse tank 30. Thus, when the line 60 between the nurse tank 30 and storage tanks 10 become filled or blocked for any reason, the relief valve 72 permits the fluid to be directed through line 74 to the nurse tank 30 to avoid damage to the tanks 10.

In operation, the nurse tank 30 is filled from a central supply and then moved to the field where the implement is being utilized. To fill the storage tanks 10 on the implement from the nurse tank 30, the operator must first open the shutoff valve 62 to permit the fluid flow from the coupler 28 through the line 12 and to the storage tanks 10. The nurse tank line 60 is then coupled with the inlet line 26 at coupling 28. The valves 76 and 78 leading from the storage tanks 10 and to the pump 20 are then closed so as to prevent fluid flow from entering the pump 20 during the filling operation. The nurse tank pump 70 is then started and fluid is moved through the pump 70 and the inlet lines 12 to the various tanks 10 to fill them from their respective lower openings. As the tanks 10 are filled, the air escapes through the vent 58. As the fluid rises in the tank 10 and contacts the floatable support 54, it will elevate the ball 52 to seat against the inverted V-shaped opening 50 and seal against fluid overflow.

During this time, the farmer need not devote his entire attention to the filling operation since the vent caps 42 will automatically close as the tanks 10 become full. To prevent damage to the tanks 10 when the tanks 10 and inlet lines 12, 14 and 26 are full and the balls 52 seal each tank closed, the fixed pressure relief valve 72 will return fluid to the nurse tank 30.

Subsequent to filling of the storage tanks 10 on the implement, the inlet line valve 28 will be closed and the nurse tank 30 apparatus will be disconnected. The shutoff valve 62 interconnecting the fluid lines 12 and 14 between the various storage tanks 10 will be closed and the outlet valves 76 and 78 connecting the fluid lines 12 and 14 with the pump 20 will be opened. This will permit fluid flow from the tanks 10 to the pump 20 and prevent fluid flow between the tanks 10 carried on each half of the implement. Accordingly, as the planter is moved over uneven terrain, the fluid will be prevented from flowing between the tanks 10 through the inlet lines 12 and 14 by the shutoff valve 62. This will prevent the lower tanks 10 from being filled from the higher tanks 10 and any spillage. The vent caps 42 will prevent the fluid from spilling from the tanks 10 as it sloshes about during movement over uneven terrain.

I claim:

1. Apparatus for receiving fluid pumped from a separate supply and for carrying and distributing said fluid from a mobile frame comprising:

at least two spaced apart fluid tanks carried on the frame, each tank having first and second openings, one of said openings being in the top portion of said tanks;

a fluid pump carried on the frame;

fluid line means connected to the other of said openings of said tanks, said line means extending between the tanks and connected with the fluid pump;

valve means in the fluid line means selectively operable to prevent fluid flow between said tanks;

means coupled with the pump for distributing fluid received from said pump to the ground;

second valve means in the fluid line means selectively operable to permit fluid flow from the fluid supply and to said fluid line means; and tank vent structure carried in the one opening of each tank, each vent structure including an opening therethrough and a member confined below said opening for reciprocable movement into and out of engagement with said opening, said member being boyant and larger than the opening in the vent structure whereby the member will seal the opening in said structure when the fluid level in said tank is such that the member is boyantly raised and forced into engagement with the opening.

2. Apparatus for receiving fluid pumped from a separate supply and for carrying and distributing said fluid from a mobile frame comprising:

first and second spaced apart fluid storage tanks carried on the frame, each tank having first and second openings, one opening being in the top portion of each of said tanks;

fluid pump means having first and second inlets and first and second outlets, said first inlet and first outlet in fluid communication with one another and separate of the second inlet and second outlet which are also in fluid communication with each other;

first and second fluid line means extending between a respective tank and a respective inlet of said fluid pump;

third fluid line means extending between the first and second fluid line means;

first and second fluid distribution means coupled with the respective first and second outlets of the pump for distributing fluid received from said pump to the ground;

tank vent structure carried in each one opening of each tank, said vent structure including an opening therein with a float means seatable in said opening to close it when fluid fills said tank;

first valve means between the third and other fluid line means selectively operable to prevent fluid flow between said tanks; and second valve means connected with the third fluid line means, operable to permit fluid to flow from the fluid supply and to said first and second fluid line means.

3. Apparatus for receiving fluid pumped from a separate supply, and for carrying and distributing said fluid from a mobile frame comprising:

a pair of spaced apart fluid storage tanks carried on the frame, each tank having first and second openings, one opening being in the top portion of said tanks and adapted to receive a lid;

fluid pump means;

fluid line means extending between the tanks and connected with the pump means;

fluid distribution means for receiving fluid from the pump means and delivering it to the ground;

first valve means in the fluid line means operable when in a first position to permit fluid flow between said tanks and when in a second position operable to prevent fluid flow between said tanks;

vented lid structure attachable to the one opening of each tank, said lid structure including a housing having a narrow upright vent opening in its upper portion, a float means reciprocably carried in the housing and seatable against the vent opening to close said vent opening when the tank is filled with fluid; and second valve means in the fluid line means selectively operable to permit fluid flow from the separate supply into said fluid line means; and bypass means between the separate supply and fluid line means for returning fluid to the supply when said tanks have been filled from the supply.

4. An apparatus for receiving fluid pumped from a separate supply and for carrying and distributing said fluid from a mobile frame including:

at least two fluid storage tanks carried on each side of the frame, said tanks having an opening near their respective top portions in communication with the atmosphere and respective inlet openings therebelow;

first fluid line means extending between the inlet openings of the tanks carried on each side of the frame;

second fluid line means interconnecting the first fluid line means;

fluid pump means in fluid receiving communication with the first fluid line means;

fluid distribution apparatus coupled with said pump means;

valve means in said second fluid line means selectively operable to prevent fluid flow to and between said first fluid line means;

vent means sealing the opening of each tank, each vent means having an opening between the interior of the tank and the atmosphere, said means further including a float structure adapted to be supported by the fluid within the tank and to seal said opening and prevent fluid escape from said tank.

* * * * *